United States Patent [19]

Wedel, Jr.

[11] Patent Number: 5,117,230

[45] Date of Patent: May 26, 1992

[54] ELECTRONIC TARGET RADAR SIMULATOR

[75] Inventor: John O. Wedel, Jr., Ellicott City, Md.

[73] Assignee: The United States of America as represented by the Secretary of the Army, Washington, D.C.

[21] Appl. No.: 687,609

[22] Filed: Apr. 12, 1991

[51] Int. Cl.$^5$ .............................................. G01S 7/40
[52] U.S. Cl. ...................................... 342/169; 342/194
[58] Field of Search ................ 342/194, 169, 171, 172, 342/190

[56] References Cited

U.S. PATENT DOCUMENTS

| | | | |
|---|---|---|---|
| 4,635,060 | 1/1987 | Mertens | 342/194 |
| 4,768,035 | 8/1988 | Thurber et al. | 342/194 |
| 4,823,132 | 4/1989 | Platt et al. | 342/169 |

Primary Examiner—Mark Hellner
Attorney, Agent, or Firm—Saul Elbaum; Frank J. Dynda

[57] ABSTRACT

A method and apparatus for electronically simulating the transmit-receive signal path of doppler radar during a target encounter in a simulator. It is an end-to-end fuze (radar) test from RF "in" to video "out". Target signature data is collected at a reduced relative encounter velocity from the actual target. The modified pulse doppler radar produces two orthogonal signals which define the complex received radar signal. These signals are then recorded. The missile radar to be tested is coupled to the simulator which simulates an actual missile to target encounter. During the test the PROMs are clocked into RF components in an RF Loop and clock counter is started. When the radar threshold is exceeded, a radar video output function stops the counter. By correlating the number of clock pulses counter to the distance marks traveled along the missile trajectory, missile radar function with respect to target location data is obtained and missle lethality computed.

4 Claims, 5 Drawing Sheets

ELECTRONIC TARGET RADAR SIMULATOR

RIGHTS OF THE GOVERNMENT

The invention described herein may be used by the United States Government for governmental purposes without the payment to the inventors of any royalty thereon.

FIELD OF THE INVENTION

This invention relates to an improved fuze testing method. More particularly, this invention relates to a fuze test in which no physical entry into the fuze circuitry is required, and in which target signature data used in the target simulator is collected at a greatly reduced target encounter velocity between an actual target and a modified missile radar.

BACKGROUND OF THE INVENTION

The performance of a doppler radar fuze is normally evaluated by field testing using actual targets. This is a relatively costly process because it may require the use of aircraft and missiles, and usually results in the destruction of the missile carrying the radar fuze being tested.

Many fuze simulators and testers have been developed in the past. These simulators use the hardware-in-the-loop concept. That is, amplitude only data is collected at relatively slow missile-target encounter velocities by breaking into the receiver channel at a wide bandwidth video stage. Then this fuze is tested by inserting the collected data, scaled to the encounter velocity, into the same port used to collect the data. This process requires breaking into a fuze which is not desired or permitted in Stockpile Reliability Testing. The disclosed simulator is an end-to-end fuze test RF "in" to video "out" which requires no entry into the fuze but just monitors the video output of the missile radar or electronic fuze. The video output is monitored by means of a built-in output connector on the missile radar for use in such testing.

In the past, target signature data collected for use in testing missile radars utilized only one of the two independent parameters (amplitude and phase) or signals required to define a complex signal such as the received pulsed doppler missile radar signal described in this invention. This invention utilizes both independent parameters, amplitude and phase.

OBJECTS AND SUMMARY OF THE INVENTION

It is an object of the invention to provide a method and apparatus for testing a missile radar fuze in a simulator without breaking into the fuze circuitry.

It is another object of the invention to provide a means of collecting data pertaining to target signature and distance at a relatively slow encounter velocity between an actual target and a modified missile radar (electronic fuze).

It is a further object of this invention to provide a means of using the actual target signature obtained at a slow encounter velocity by loading amplitude and phase information from the target signature obtained into Programmable Read Only Memories which are part of an RF loop in the simulator.

It is another object of this invention to velocity scale the collected data to actual encounter velocity to replicate the actual missile to target-aircraft radar transmit-receive path in the simulator.

It is an additional object of this invention to test a Missile Radar (electronic fuze) by coupling the missile radar to the simulator, loading the Programmable Read Only Memories (PROM)s with the amplitude and phase waveforms of the target signature, and initiating a start switch whereby the PROMs are clocked into the RF components in the RF loop of the simulator and a counter is started.

It is also an object of this invention to correlate the number of clock pulses counted to the distance markers to measure radar function with respect to target location and thereby determine missile lethality.

SUMMARY

Briefly, in accordance with this invention, a method and apparatus are provided for electronically simulating the transmit-receive signal path of doppler radar during a target encounter. The simulator is an end-to-end fuze test from RF "in" to video "out". Target signature data is collected at a reduced relative encounter velocity from the actual target using a modified pulse doppler missile radar. The modified pulse doppler radar produces two orthogonal signals which define the complex received radar signal. These signals are then recorded. The target signature data obtained is then scaled to a higher velocity and loaded into PROMs in the simulator. The missile radar to be tested is coupled to a simulator which simulates an actual missile to target encounter. During the test the PROMs are clocked into RF components in an RF Loop and a clock counter is started. When the radar threshold is exceeded, a radar video output function stops the counter. By correlating the number of clock pulses counted to the distance marks traveled along the missile trajectory, missile radar function with respect to target location data is obtained and missile lethality computed.

Although the technique disclosed herein is applicable for pulsed, FM-CW, monostatic, bistatic, long and short range doppler radar; the embodiment described herein is for a short range pulsed doppler radar with a single range gate to simulate a missile/aircraft encounter. The missile carries the pulse doppler radar (electronic fuze) and the aircraft is the target.

BRIEF DESCRIPTION OF THE DRAWINGS

The invention will be better understood, and further objects, features, and advantages thereof will become more apparent from the following description of the preferred embodiments, taken in conjunction with the accompanying drawings in which.

DESCRIPTION OF THE PREFERRED EMBODIMENT

Figure 1:
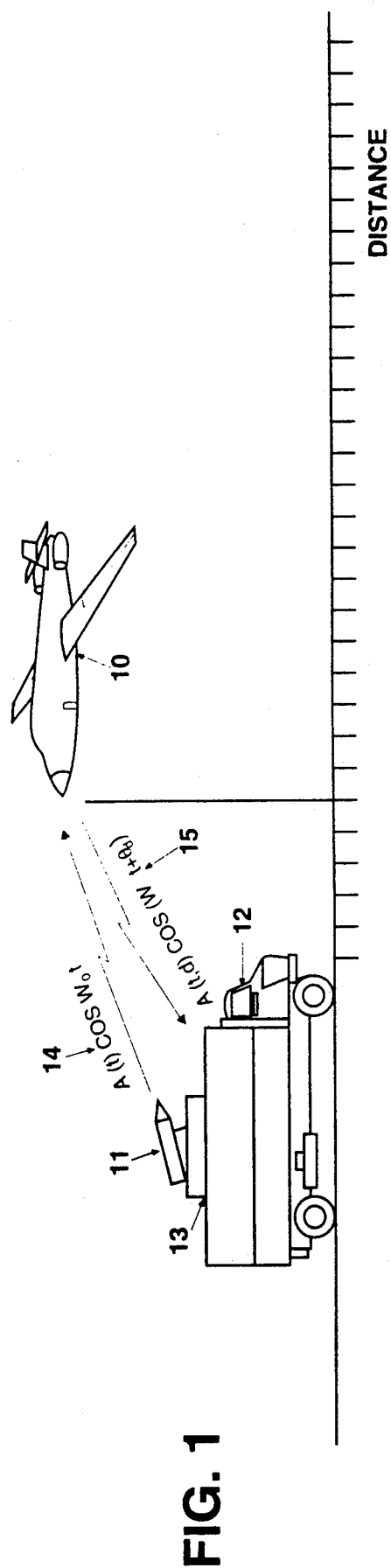
FIG.1 is a representation of the Target Signature Data Collection System and the two independent parameters.

Reference is now made to FIG.1 showing data collection at a greatly reduced encounter velocity between an actual suspended target-aircraft 10 and a modified pulse doppler missile radar mounted in an actual missile 11. An example of how this is accomplished is the target 10 is suspended above the ground and the modified radar (described later) is moved on a vehicle such as a truck 12 at a relatively slow closing velocity of several feet per second rather than several thousand feet per second experienced in an actual encounter, along a path to simulate a missile passing by the target 10. As the modified missile radar on the truck 12 travels toward then under and away from the target 10, data from the radar signal return and the distance to the target are recorded. The transmitted radar signal is represented by the equation 14, $A(t)\cos w_o t$, where $A(t)$ represents the amplitude of the transmitted pulse waveform.

The missile 11 is placed in a cradle 13 and echo absorbing material is placed around the cradle and where needed to prevent ground reflections from distorting the uplook antenna pattern from the modified missile radar.

The received signal represented by equation 15, $A(t,d)\cos(w_o t + \theta_d)$ is the vector sum of the radar returns reflected from various "high spots" on the target-aircraft and is proportional to the transmitter power, transmitter and receiver antenna gains, free space attenuation and coefficient of reflectivity of the aircraft target. The amplitude of the received radar return signal is a function of time (t) and distance (d) as shown in equation 15. The phase of the received signal is represented by $\theta_d$ as shown in equation 15. In an actual encounter, target motion or target scintillation will modulate the received signal, and could be simulated; however, its effects on target detection sensitivity are minor. The target-aircraft signature along this path is uniquely characterized by the received missile radar signal 15. Since the received radar signal is a vector or complex signal, two independent parameters such as amplitude FIG.1a and phase FIG.1b, are required to define this signal.

Figure 2:
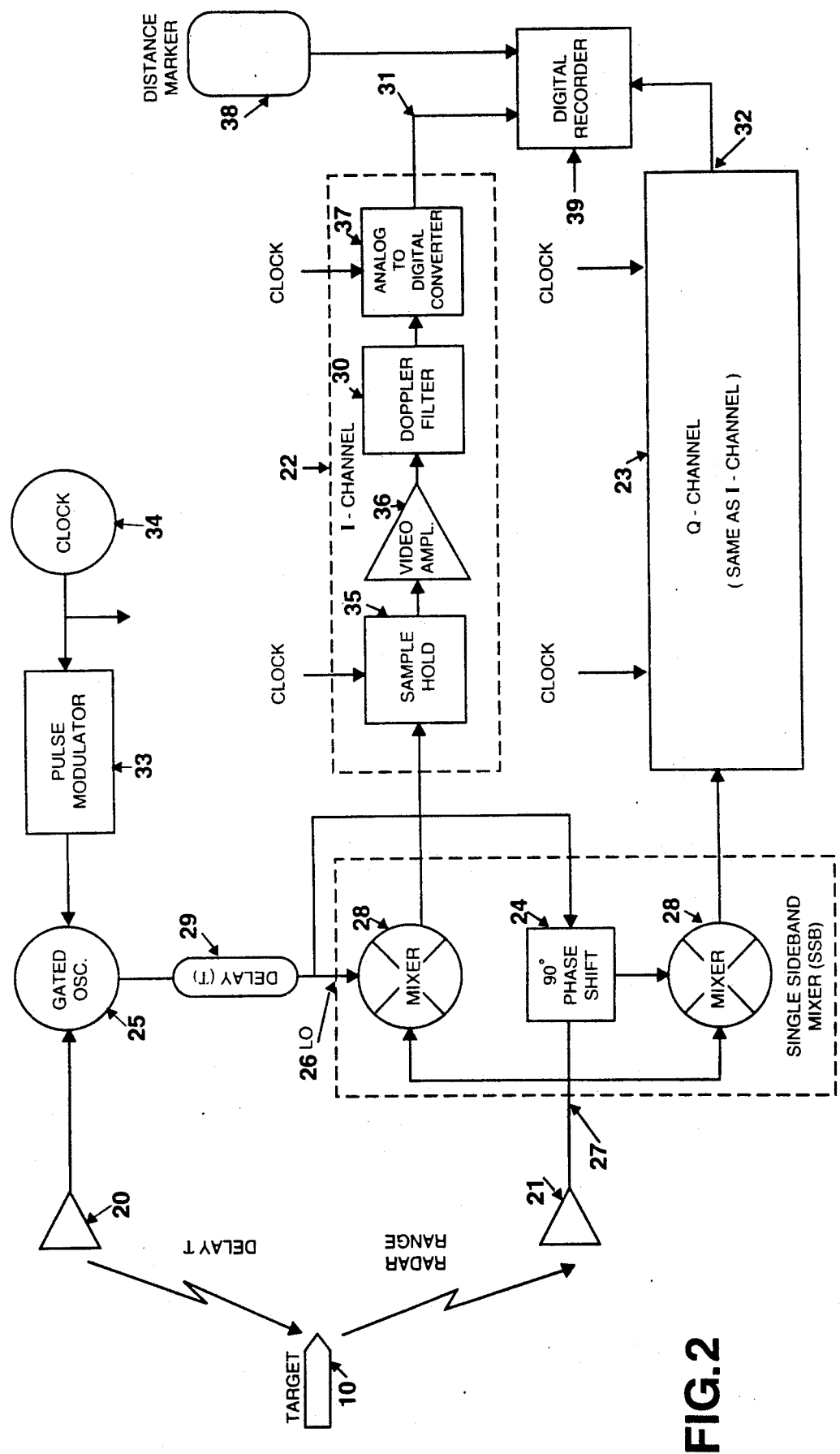
FIG.2 is a block diagram of a modified missile radar used in the data collection system of FIG. 1.

The modified missile radar 9 block diagram is shown in FIG.2. Typical search and tracking radar frequencies are in the GHZ frequency range. Recording the amplitude and phase of the received signal is not practical at these frequencies. Therefore, the signal in this case is heterodyned to a baseband frequency and two independent or orthogonal parameter measurements are produced by means of the I-channel 22 and the Q-channel 23.

From these I and Q measurements, amplitude (A) and phase of the received radar signal are easily calculated as follows:

$$A = (I^2 + Q^2)^{\frac{1}{2}} \quad \text{(equation 1)}$$

$$\theta = \tan^{-1}\frac{I}{Q} \quad \text{(equation 1)}$$

The transmit 20 and receive 21 antennas are the actual missile radar antennas whose radiation patterns are typical or the norm of the radar antennas. The transmitter of the modified missile radar typically consists of a clock 34, a pulse modulator 33, and a gated oscillator 25 whose transmit waveform is typical of the radar transmitters. Peak and average powers are not as critical because these parameters are compensated for during simulator calibration described later.

Figure 3:
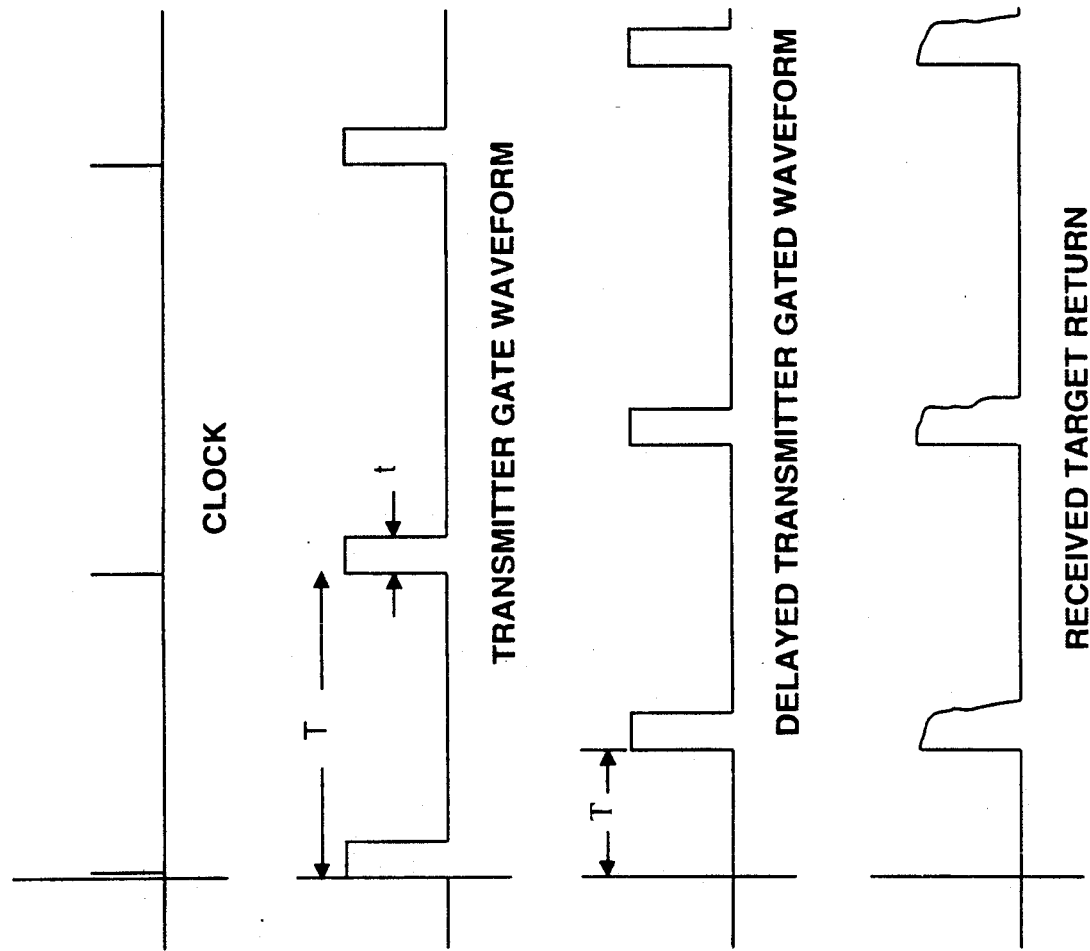
FIG.3 is a timing diagram of the modified missile radar signals during the data collection process.

The transmitter oscillator 25 is gated on for t seconds at a repetition rate of T seconds as shown on the timing diagram FIG.3. A sample of the transmitted signal is delayed by $\tau$ seconds and used as the local oscillator (LO) 26. The LO forms the range gate by selecting the delay $\tau$ 29 to be the same as the desired range delay. The LO and return signals 27 are mixed in Single-Side-Band (SSB) mixers 28, in conjunction with a 90 degree phase shifter 24 to produce orthogonal or I and Q signals at a baseband frequency. The signals are then linearly amplified and doppler filtered in the identical I and Q channels 22, and 23 respectively. The I and Q channels typically consist of a sample/hold circuit 35 timed by clock 34, a video amplifier 36, a doppler filter 30, and an analog to digital filter 37, also timed by clock 34. The doppler filter geometric frequency and bandwidth are reduced by the ratio of the collected data velocity to the encountered velocity. For example, if the data is collected at 1 ft/sec and the encountered velocity is 2000 ft/sec, the doppler filter 30 geometric center and bandwidth are reduced by 1/2000. The output of the doppler filters are then digitized and these outputs, 31 from the I channel and 32 from the Q channel are recorded by a digital recorder 39.

The simulator shown in FIG. utilizes the modified missile radar 9 used for data collection to calibrate the simulator. The modified radar used for data collection is coupled into the simulator using an anechoic chamber 40 or space hood. The total RF Loop delay 49 is set to be $\tau$ seconds to match the radar range delay $\tau$, shown in FIG.2. In the RF Loop 41 the received radar signal 42 is amplitude and phase modulated by the waveforms stored in simulator Programmable Read Only Memories (PROM)s 43 and 44. The amplitude modulation is accomplished by Variable Digital Attenuator 47 and the phase modulation is accomplished by variable digital phase shifter 48. The waveforms stored in the PROMs are the amplitude and phase data derived from equations 1 and 2. The data is clocked from the PROMs by switch 53 and a radar sample 63 delayed T/2 seconds by 50 to allow the RF Loop enough time to settle before the next radar signal arrives. The radar sample 63 is obtained by an RF pickup horn in the anechoic chamber 40 or spacehood.

The I and Q signals 31 and 32 respectively are viewed on a scope 52 after passing through a digital to analog converter 51 and the amplitude and phase adjusted by the RF Loop adjustable attenuator 45 and phase shifter 46 to match the amplitude and phase observed during data collection. Therefore, since the signature data 64 observed from the simulator replicates the signature represented by the data collected from the actual target-aircraft, the simulation of the missile radar transmit-receive path is completed except for velocity scaling of the collected data to the encounter velocity.

The RF Loop attenuation and phase calibration compensates for the attenuation of the anechoic chamber or space hood and all the parameters of the modified missile radar except the antenna pattern. Each radar will have a slightly different antenna pattern that will cause a small gain error in the simulation. This slight error could be compensated for by measuring this difference between antenna patterns on each radar tested and adjusting the loop attenuation accordingly, but this error is normally relatively small.

Figure 1A:
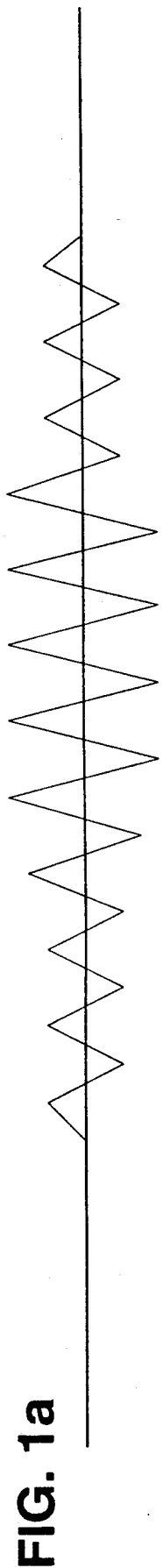
Figure 1B:
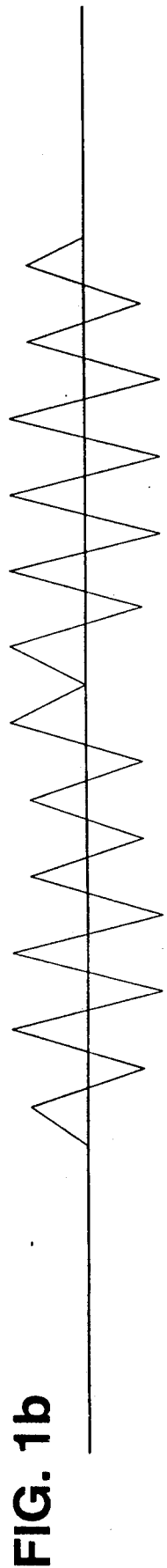

The doppler signature along a given path is uniquely characterized by the received radar signal amplitude and phase, FIGS. 1a and 1b, and is independent of the relative velocity between the radar and target. Therefore, the data can be collected at low relative velocities and scaled to higher velocities. For example, for a pulse doppler radar moving at a velocity v' ft/sec, x number of pulses are received per unit distance. If the velocity is doubled to 2v' ft/sec, x/2 pulses are received per unit distance. Therefore, to effectively double the velocity of the collected data, every other sampled data point is used. Similarly, to increase the velocity by a factor of 10, every tenth data point collected is used, etc.

Figure 4:
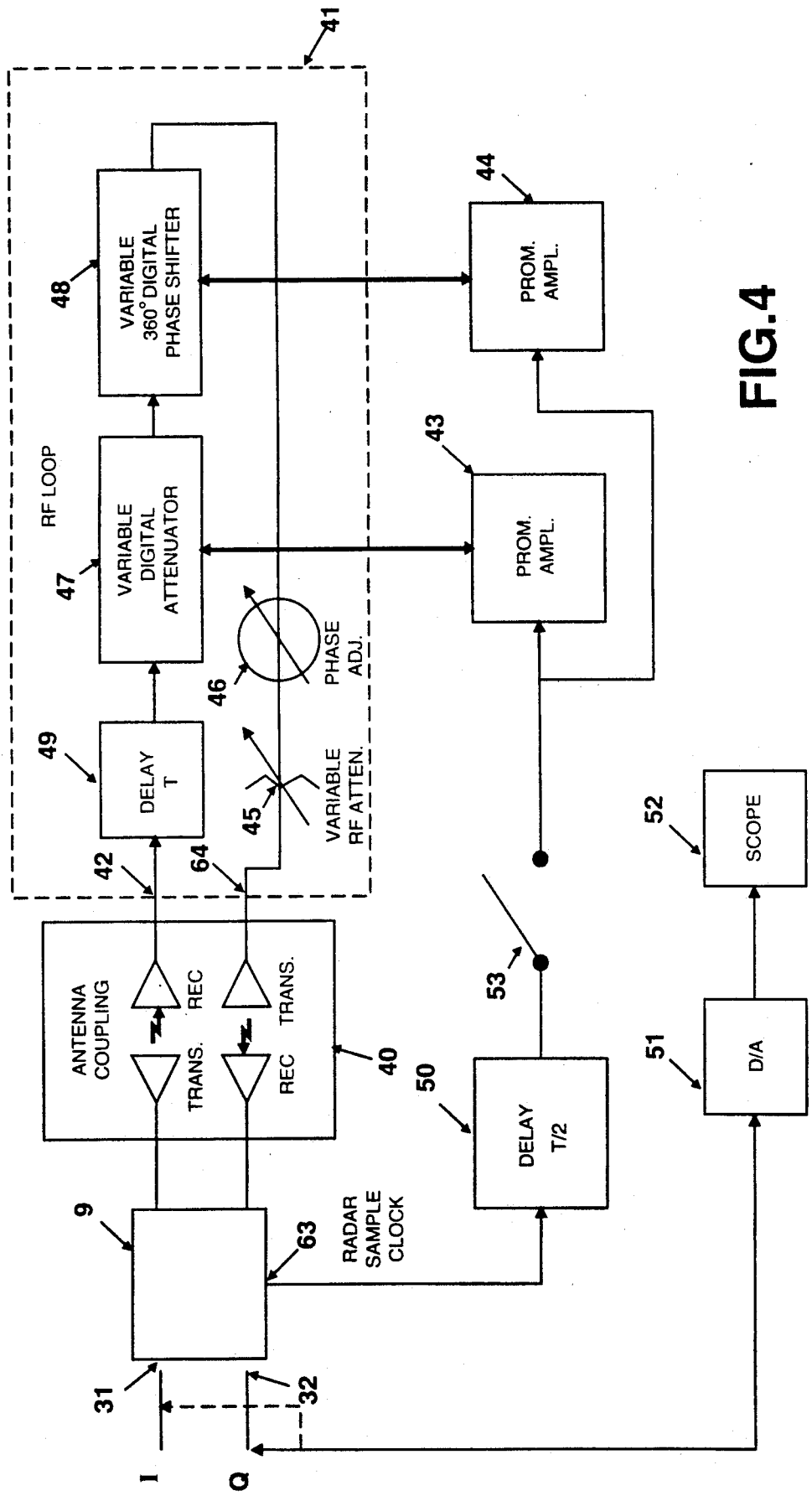
FIG.4 is a block diagram of the simulator.
Figure 5:
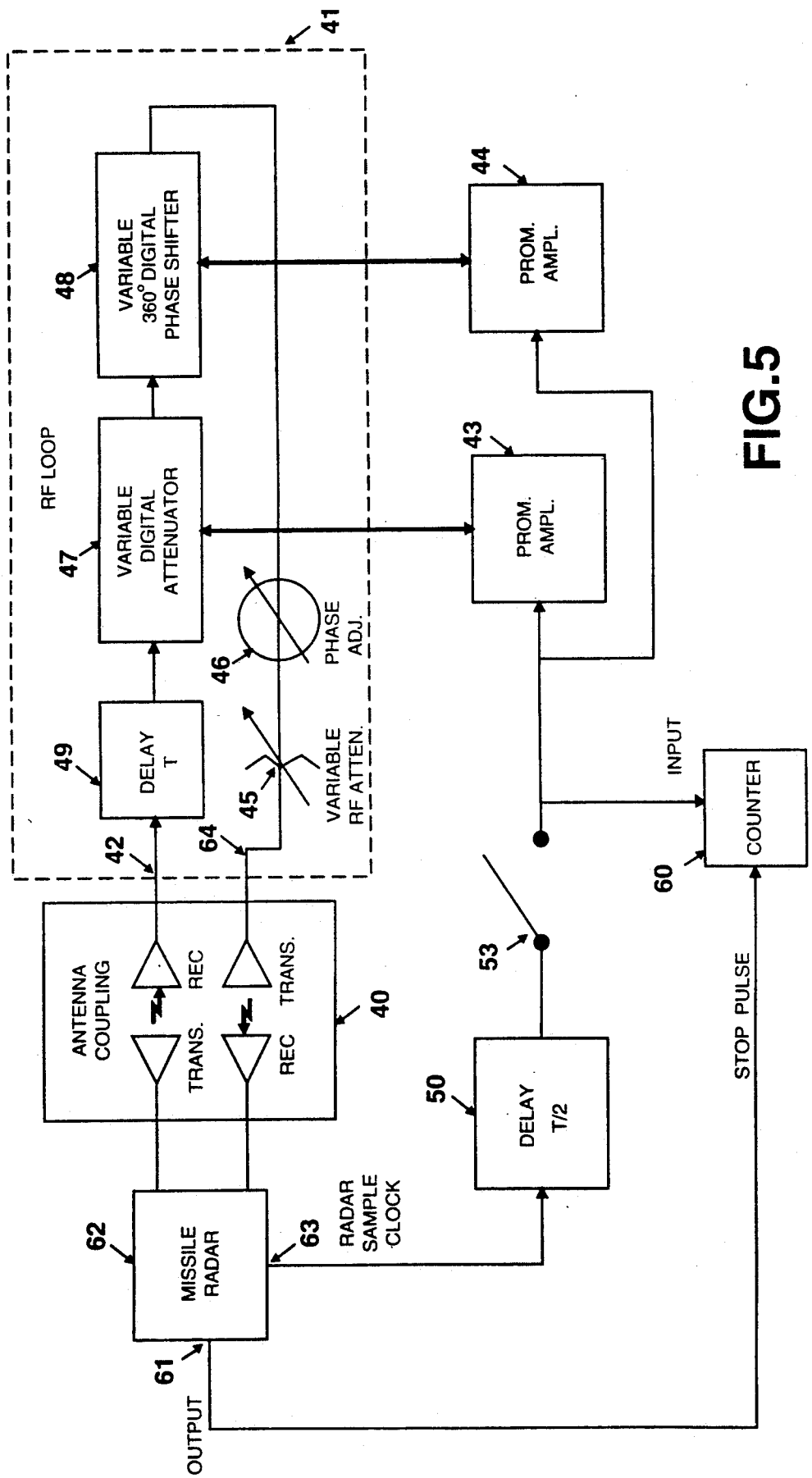
FIG.5 is a block diagram showing simulator testing of a missile radar (electronic fuze).

Referring to FIG. 5, to test a missile radar 62, the missile radar is coupled to the simulator exactly the same way the modified radar 9 was connected to the simulator via the anechoic chamber 40 or space hood, as shown in FIG. 4. The PROMs 43 and 44 are ultravioletly loaded with the amplitude and phase waveforms with the velocity scaled to the desired encounter velocity. When the start switch 53 is initiated, the PROMs 43 and 44 are clocked into the RF Loop components and the clock counter 60 is started. When the radar 62 threshold is exceeded, a radar output function 61 provides an output to stop the clock counter 60. Correlating the number of clock pulses counted to the distance marker information 38 recorded along with the signature data, provides a measurement of missile lethality.

The foregoing description of a preferred embodiment of the invention is not intended to be exhaustive or to limit the invention to the precise form disclosed. The embodiment was chosen to best enable others skilled in the art to understand the invention.

What is claimed and desired to be secured by Letters Patent of the United States is:

1. A method of electronically simulating an actual missile-radar target encounter for testing said missile-radar comprising the steps of:
    collecting data pertaining to target signature at a reduced relative encounter velocity between a modified missile radar and an actual target;
    recording data pertaining to independent amplitude and phase signals of said target signature from outputs of said modified missile radar and simultaneously recording data pertaining to target distance;
    loading data comprising amplitude and phase measurements pertaining to said target signature into Programmable Read Only Memories in an RF Loop which is part of a simulator;
    coupling said modified missile radar to the simulator by means of an anechoic chamber or space hood;
    calibrating the RF Loop of the simulator by means of amplitude and phase adjustments so that the outputs of said modified missile radar replicate the outputs of said modified missile radar during data collection at a reduced relative encounter velocity;
    scaling the output of said modified missile radar coupled to said simulator to actual encounter velocity;
    coupling a missile radar to be tested to the simulator in the same manner as the modified missile radar;
    initiating a test sequence wherein the loaded Programmable Read Only Memories modulate the received radar signal in the RF Loop of the simulator, and wherein a clock counter is started;
    providing a video output from the missile radar being tested to indicate when the missile radar threshold is exceeded, and
    correlating the number of clock pulses counted by said initiated counter with target distance to determine missile lethality.

2. A method of collecting data as in claim 1, comprising:
    suspending a target;
    modifying a missile radar;
    mounting said missile radar on a vehicle which moves at a reduced velocity with respect to said target than the actual velocity experienced by a missile radar during an actual target encounter; and
    recording the output of the modified missile radar whereby the amplitude and phase of the received radar target signal can be determined.

3. A method of recording data as in claim 1, wherein: the two independent amplitude (A) and phase ($\theta$) signals are expressed by the following equations:

$$A = (I^2 + Q^2)^{\frac{1}{2}}$$

$$\theta = \tan^{-1} I/Q$$

wherein I and Q are two orthogonal signals produced in the modified missile radar by single sideband mixers using a delayed sample of transmitted missile radar power as a local oscillator and mixing this in conjunction with a 90 degree phase shifter with the received radar signal.

4. A modified missile radar comprising:
    transmitting means which is gated on for t seconds at a repetition period of T seconds,
    sampling means which delays a sample of the transmitted power by $\tau$ (Tau) seconds,
    local oscillator means which uses said sample of transmitted power as a local oscillator signal,
    range gate means wherein said delayed local oscillator signal forms a range gate by selecting said sampling means delay to be the same as a desired range delay,
    single sideband mixing means utilizing said local oscillator means and a missile radar return signal to produce orthogonal or I and Q signals at a baseband frequency wherein the I and Q signals are outputted by identical channel means further comprising:
    sample/hold and video amplifier means for linearly amplifying each channel of said single sideband mixing means,
    doppler filter and analog to digital converter means for each channel wherein the doppler filter geometric center frequency and bandwidth are reduced by the ratio of the collected data velocity to the actually desired encounter velocity, and wherein both I and Q channels are then recorded on a recording means together with distance to target data.

* * * * *